United States Patent [19]
Fergason et al.

[11] 3,881,809
[45] May 6, 1975

[54] REFLECTION SYSTEM FOR LIQUID CRYSTAL DISPLAYS

[75] Inventors: James L. Fergason, Kent; Thomas B. Harsch, Stow, both of Ohio

[73] Assignee: Hoffmann-La Roche Inc., Nutley, N.J.

[22] Filed: May 25, 1973

[21] Appl. No.: 364,027

Related U.S. Application Data

[63] Continuation-in-part of Ser. No. 233,678, March 10, 1972, abandoned.

[52] U.S. Cl. .......... 350/160 LC; 240/1 EL; 350/150
[51] Int. Cl. .............................................. G02f 1/16
[58] Field of Search ..... 350/150, 160 LC; 240/1 EL

[56] References Cited
UNITED STATES PATENTS

| | | | |
|---|---|---|---|
| 3,248,165 | 4/1966 | Marks | 350/144 X |
| 3,625,591 | 12/1971 | Freiser | 350/150 |
| 3,652,148 | 3/1972 | Wysocki et al. | 350/150 |
| 3,731,986 | 5/1973 | Fergason | 350/150 |
| 3,748,017 | 7/1973 | Yamamura et al. | 350/160 LC |
| 3,756,694 | 9/1973 | Soref et al. | 350/160 LC X |

OTHER PUBLICATIONS

Bush et al.: "Liquid Crystal Display Device," IBM Technical Disclosure Bulletin, Vol. 14, pg. 223, June, 1971.

*Primary Examiner*—Edward S. Bauer
*Attorney, Agent, or Firm*—Samuel L. Welt; Bernard S. Leon; Mark L. Hopkins

[57] ABSTRACT

High efficiency reflection without ghosts or distracting background images is obtained in a liquid crystal display of the polarized light shutter type through the use of a diffuse, highly efficient reflector placed behind the polarized liquid crystal cell. The diffuse reflector scatters the light at very large angles, providing a good viewing range while preserving the polarization. The result is a gain in contrast as compared to prior arrangements with an accompanying increase in the viewing angle.

9 Claims, 3 Drawing Figures

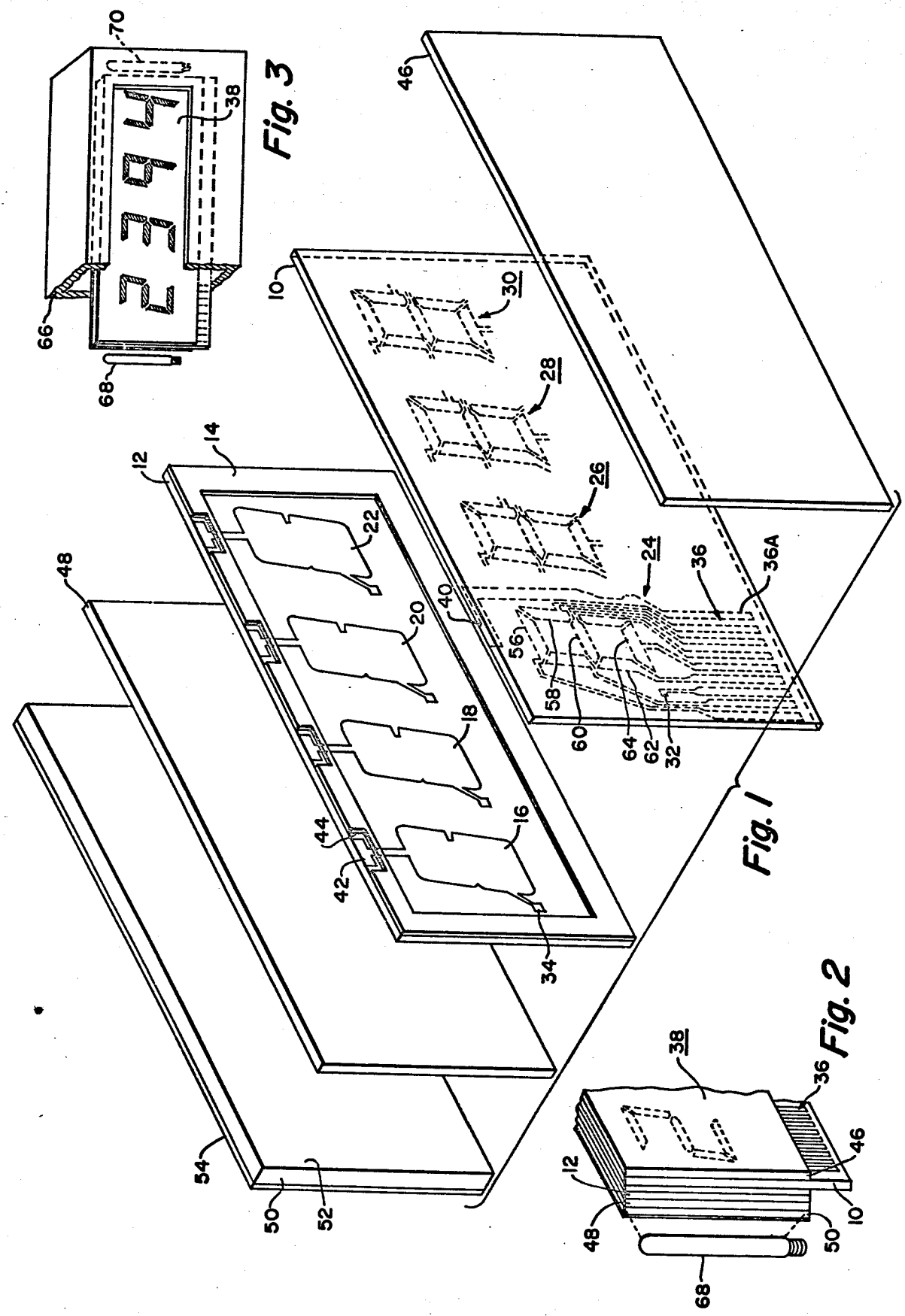

REFLECTION SYSTEM FOR LIQUID CRYSTAL DISPLAYS

CROSS-REFERENCE TO COPENDING APPLICATIONS

This application is a continuation-in-part of copending application Ser. No. 233,678 filed Mar. 10, 1972, now abandoned.

BACKGROUND OF THE INVENTION

It is well known that the construction of digital displays using liquid crystals has certain definite advantages. One of the most important of these is the low power needed to drive the liquid crystal displays, allowing easy interface with modern solid-state circuitry and prolonged battery operation of the devices. The advantages of low power are gained by using the liquid crystals to control ambient light or artificial light produced by a source other than the display itself. Hence, the power levels necessary in most displays to produce emission of light are unnecessary. However, in order for the liquid crystals to control light, particularly ambient light, a method of reflecting the light through the liquid crystal display must be provided.

There are two methods using liquid crystals to control light. One of these utilizes a light scattering effect, generally known as dynamic scattering, while the other uses polarized light with the liquid crystal acting as a light valve. The latter method is described in detail, for example, in U.S. Pat. No. 3,731,986 issued May 8, 1973.

Both types of liquid crystal displays, whether dependent upon dynamic scattering or polarized light, can be used as low power devices provided that a reflector of some type is placed behind the display in order that ambient light, or some low power light source, can be used to illuminate the display. In a light scattering display, the liquid crystal material, when activated, forward-scatters light which is then reflected from a reflector behind the display back through the liquid crystal material where it is forward-scattered again. Due to this scattering of the light, the activated liquid crystal appears cloudy or opalescent to the observer.

In a polarized light shutter type of liquid crystal display, the liquid crystal cell is such that it rotates the plane of polarization of polarized light through 90°. When the liquid crystal cell is placed between cross-polarizers, the unactivated cell can be made to transmit light. If a reflector is placed behind the liquid crystal cell and polarizer combination, with sufficient polarization retained after reflection from the reflector, the display can be made to appear bright when unactivated. However, when a liquid crystal cell of this type is activated, by applying a potential thereacross, the ability of the liquid crystal to rotate the plane of polarization is destroyed and the cell appears dark or opaque since the incident light is blocked from the reflector. As will be seen, however, the cell can be constructed so as to normally block light until activated. The result is essentially the same except that the images appear white on a black background rather than vice versa when the cell transmits light when unactivated.

It is known that for liquid crystal cells utilizing dynamic scattering, a mirror with a high efficiency reflection can be used as the reflector to construct an ambient light display. In fact, the back electrode of the liquid crystal cell can be the metalized reflecting surface. An arrangement of this sort forms an acceptable display, although it is easy to obtain extremely annoying reflections from the display. In addition, the viewing angle obtained is not large since the angles through which the light is scattered are essentially dependent upon the liquid crystal material which scatters light predominantly in the forward direction. Hence, the drawbacks of a metalized reflector in combination with light scattering liquid crystal displays are annoying background reflections and a small viewing angle.

The polarized light method of constructing liquid crystal displays can also be implemented with the use of a metalized reflector placed in back of the last polarizer. In fact, this should be the ideal way of constructing a display using polarized light since the polarization of a beam of light is preserved when reflected from a metallic reflector. In practice, however, it has been found that when a simple metalized reflector is placed behind a polarized light-type liquid crystal display, the display has an extremely small viewing angle. In addition, there are again annoying background reflections and a metallic sheen to the display which is physiologically unacceptable.

In order to alleviate the difficulties encountered with mirror reflectors for polarized light liquid crystal displays, high reflectivity white backgrounds have been investigated. These include high reflectivity backgrounds constructed from alumina, ceramic and alumina sheets painted with a high reflectivity paint, white paper, white plastic and the like. It was found that all of these types of high efficiency white reflectors were an improvement over a metallic reflector in that they gave an improved viewing angle due to their diffuse reflection and fairly good contrast ratio between the unactivated and activated states of the liquid crystal display. However, the contrast ratios are not as high as would be desired and expected from the reflectivity. This is due perhaps to the fact that all high white reflecting surfaces tend to depolarize light impinging on them, resulting in a loss of contrast ratio.

SUMMARY OF THE INVENTION

In accordance with the present invention, a reflector arrangement is provided for liquid crystal displays of the polarized light type which promotes a wide viewing angle, good reflection of polarized light, a high contrast ratio, and the absence of unwanted reflections.

In one embodiment of the invention, an initially transparent plate formed from glass, plastic or other similar material is ground or sand-blasted on one side to provide a diffuse surface behind one of the two polarizers of a liquid crystal display of the polarized light type. The other side of the plate is then coated with a metal such as aluminum, nickel, or chromium having high reflectivity. The combination of the diffuse surface on one side of the transparent plate and the metalized, reflective coating on the other results in a diffuse, highly efficient reflector which, when placed behind a polarized liquid crystal light shutter display, results in diffuse reflection scattering of light at very large angles while preserving the polarization of the reflected light so that there is a gain in contrast and a substantial increase in the viewing angle over prior art liquid crystal displays.

An additional feature of the invention is the provision of a lamp or light source in combination with the transparent plate having diffuse and reflective surfaces on its opposite sides so that the display may be viewed without ambient light. In this latter case, the light source comes from the lamp which introduces illumination through the transparent portion of the plate edges and is then reflected from the metalized coating behind the plate.

In another embodiment of the invention, the reflector assembly comprises a metallic reflector with a roughened surface. This may be produced by sandblasting or by forming the reflecting surface from granular particles. The effect is the same as in the case of a transparent plate bounded by diffuse and metallized surfaces. That is, it acts to reflect and scatter polarized light without depolarizing it.

The above and other objects and features of the invention will become apparent from the following detailed description taken in connection with the accompanying drawings which form a part of this specification, and in which:

FIG. 1 is an exploded view of the liquid crystal cell of the invention;

FIG. 2 is an end view of the assembled liquid crystal cell of the invention, showing the manner in which a light source may be directed onto a reflecting means at the backside of the cell for illuminating numerals or other images displayed by the cell; and FIG. 3 is a perspective view of the liquid crystal display of the invention disposed within a suitable housing.

With reference now to the drawings, and particularly to FIGS. 1 and 2, the liquid crystal cell shown is of the polarized light shutter type described in U.S. Pat. No. 3,731,986, issued May 8, 1973. It comprises a pair of transparent plates 10 and 12 separated by means of a suitable gasket 14. The gasket 14 spaces the plates in an amount equal to about .0005 inch; and in the space between the plates 10 and 12 and within the enclosure formed by the gasket 14 is a layer of a nematic-phase liquid crystal material with a positive dielectric anisotropy. The liquid crystal material preferably comprises major portions such as 20 to 80 percent of bis-(4'n-octyloxybenzal-2-chlorophenylene diamine and p-methylbenzal-p'-n-butylaniline, these making about 60 to 97 percent of the total composition and p-cyanobenzal-p'-n-butylaniline comprising the remaining 3 to 40 percent. This material is more fully described in copending application Ser. No. 113,948, filed Feb. 9, 1971 and assigned to the Assignee of the present application.

As shown in FIG. 1, the opposing surfaces of the transparent plates 10 and 12 have formed thereon patterns of transparent conductive material such as tin oxide or indium oxide. The plate 12 is provided with four patches of transparent conductive material 16, 18, 20 and 22; while the other transparent plate 10 is provided with four sets of mutually insulated strips of transparent conducting material, the four sets being identified generally by the reference numerals 24, 26, 28 and 30. When the plates 10 and 12 are bonded to opposite sides of the gasket 14, the transparent conductive patches 16–22 will be aligned with the sets of strips 24–30 on the plate 10. A dot 32 for each of the sets of strips on plate 10 will be aligned with a corresponding dot 34 on the plate 12.

The operation of the liquid crystal cell will be described hereinafter; however it will be appreciated that when all of the strips of the set 24, for example, are opaque while the surrounding areas transmit light, the resulting configuration will represent the numeral 8. Similarly, by causing selected ones of the strips in set 24 to become opaque, any numeral from 1 through 0 can be made to appear.

The various mutually insulated conductive strips in the sets 24–30 are adapted to be connected through a plurality of mutually insulated strips of transparent conducting material 36 to external leads, not shown. In this respect, it can be seen from FIG. 2 that the lower end of the plate 10 with the strips 36 thereon extends beneath the remainder of the liquid crystal cell, generally designated by the reference numeral 38, in order that a suitable electrical connector can be slipped over the lower portion of the plate 10 to connect the conducting strips 36 to external electrical circuitry. Note that the strip 36A extends from the bottom of plate 10 all the way to the top thereof where it terminates in a horizontal portion 40 which is directly opposite a corresponding horizontal portion 42 connected to the patch 16 of electrically conducting material on plate 12. An electrically conductive epoxy material or the like is placed in an opening 44 in the gasket 14 so as to interconnect the portions 40 and 42. With this arrangement, one terminal of a potential source can be connected to the strip 36A and, hence, to the conductive patch 16 on one side of the liquid crystal material; while selected ones of the remaining strips 36 can be connected to the other terminal of the same potential source, thereby establishing a potential gradient resulting in an electric field across the liquid crystal material in selected areas, depending upon which ones of the strips 36 are energized (i.e., connected to the other terminal of the potential source).

In the manufacture of the liquid crystal unit, the layers of transparent conducting material that are in contact with the nematic-phase liquid crystal material must be prepared by being stroked or rubbed unidirectionally with, for example, a cotton cloth. Furthermore, the transparent conducting material on plate 12 must be rubbed unidirectionally at right angles to the direction of rubbing of the transparent conductive material on plate 10. The effect of this is to produce a twisted nematic structure in the intervening liquid crystal material as is more fully explained in the aforesaid U.S. Pat. No. 3,731,986. In contact with the plate 10 is a first polarizing plate 46, and on the backside of the plate 12 is a second polarizing plate 48. The planes of polarization of the two plates 46 and 48 are at right angles to each other, the plane of polarization of the plate 46 being parallel to the direction of rubbing of the transparent conductive material on plate 10. Finally, behind the second polarizer 48 is a transparent plate 50 formed of glass, plastic or some other material which is ground or sand-blasted on its forward face 52 to provide a diffuse surface while the other side of the plate 50 is coated with a layer 54 of a metal such as aluminum, nickel or chromium having high reflectivity characteristics. All of the plates shown in FIG. 1 are assembled into the sandwich structure 38, perhaps best shown in FIG. 2.

In the operation of the device, ambient light impinging on the forward face of the plate 46 will pass through the plate as light polarized in the direction of rubbing of the lines on the transparent conductive material on plate 10. This polarized light, as it passes through the layer of liquid crystal material between the plates 10 and 12, will be rotated through 90°; and this 90° rotation will occur throughout the entire surface area of the layer of liquid crystal material, assuming that an electrical potential is not applied between the electrically conductive coatings on the plates 10 and 12. The plane of polarization of polarizer 48 is 90° with respect to that of polarizer 46. Hence, with no electrical potential applied between the electrically conductive films on plates 10 and 12, the polarized light will pass through the entirety of the liquid crystal cell, through the diffuse surface 52 of transparent plate 50, and will then be reflected from surface 54 where it again passes through polarizer 48, the liquid crystal cell and polarizer 46. Under these circumstances, the entire display will appear white.

Now, if an electrical potential, in the order of 5 volts or greater, is applied between the conducting films on the plates 10 and 12, the liquid crystal unit will no longer rotate the plane of polarization through 90° in the areas of the energized strips on plate 10. Hence, under these circumstances, polarizer 48 will block light and the areas across which an electrical potential exists will appear dark on a white background. In FIG. 2, the numeral 2 is shown; and this can be achieved by applying a potential of one polarity to conducting strip 36A whereby the patch 16 of electrically conductive material on plate 12 has a potential of one polarity applied thereto while applying a potential of the opposite polarity to the conductors connected to strips 56, 58, 60, 62 and 64 of the set 24. Similarly, other numerals can be made to appear by selectively energizing ones of the strips in each of the sets 26 through 30 while at the same time energizing the conductive patches 16–22 on the opposite side of the liquid crystal material.

In assembling the liquid crystal cell, the transparent conductive films are applied to plates 10 and 12 and rubbed at right angles to each other as explained above. Thereafter, the gasket 14 is applied and a drop of liquid crystal material placed within the area encompassed by the gasket. Then the plate 10 is moved into engagement with the gasket 14 and bonded thereto, in which process the drop of liquid crystal material spreads out into a thin film. The polarizing plates 46 and 48 are added as well as the reflector assembly comprising the transparent plate 50 having a diffuse forward surface 52 and a metalized rear surface 54. The resulting assembly appears as in FIG. 2 and can be positioned within a housing 66 such as that shown in FIG. 3.

In the case where the intensity of ambient light is insufficient to distinguish the numerals formed when selected areas of the transparent conductive films are energized, lamps 68 and 70 may be provided adjacent the edges of the liquid crystal cell 38 as shown in FIGS. 2 and 3. These lamps direct light into the transparent plate 50; and at least a portion of this light is reflected from the metalized backing 54 and passes through the liquid crystal material and the polarizers with the numerals again appearing dark on a light background.

As was explained above, the metalized surface 54 provides excellent reflective characteristics; while the diffuse front surface 52 of the reflecting arrangement scatters the light, increasing in scattering angle, both as it passes into the transparent plate 10 and as it is reflected and again passes through the scattering or diffuse surface. As a result, the light being scattered twice causes a substantial increase in the viewing angle but does not cause any loss in polarization. As viewed from the front, then, a high degree of contrast exists between the amount of light passing through those segments of the transparent conductive material which are activated as explained above and those which are not. A is more fully explained in the aforesaid U.S. Pat. No. 3,731,986, where parallel polarizers are utilized rather than cross-polarizers, an active segment passes light which is contrasted against a dark background.

Instead of using the transparent plate with a diffuse surface on one side and a metallized reflector on the other as shown in FIG. 1, it is also possible to form the reflector assembly from a sheet of reflective, metallic material which is roughened on the side facing the liquid crystal. This can be accomplished by sandblasting a sheet of metallic, reflecting material or by forming the sheet from granules or small spheres of metallic, reflecting material. In the latter case, the granules can be embedded in a plastic or the like matrix. Alternatively, the assembly can be formed by vacuum depositing a layer of metallic, reflecting material such as aluminum on a substrate having a roughened surface such that the reflecting surface will also be rough to the point where it will scatter light. In any case, it is essential that the reflecting surface be metallic and such as to be able to change the direction of propagation of polarized light without changing the electric vector of such light (i.e., depolarizing it). This is the case in all embodiments of the invention in contrast to white reflecting surfaces (e.g., alumina and white paper) discussed above.

Although the invention has been shown and described in connection with a certain specific embodiment, it will be readily apparent to those skilled in the art that various changes in form and arrangement of parts may be made to suit requirements without departing from the spirit and scope of the invention.

We claim as our invention:

1. A liquid crystal display comprising a layer of liquid crystal material disposed between first and second transparent parallel plates to provide a sandwich structure through which light can pass, said plates being coated on only selected areas thereof with films of transparent conductive material, means for polarizing light passing through said transparent plates and said liquid crystal layer, means for establishing a potential difference between films on the respective plates such that some areas of the sandwich structure will transmit light while others will not to thereby form an optical image, and reflector means adjacent one of said plates and adapted to reflect polarized light which has passed through the liquid crystal material back through the liquid crystal material, said reflector means comprising a third transparent plate having a diffuse surface on one side adjacent said one plate and a reflective surface on its other side.

2. The liquid crystal display of claim 1 including at least one edge lighting lamp for introducing light into the edge of said third transparent plate.

3. The liquid crystal display of claim 1 wherein said diffuse surface scatters light both as it enters the third transparent plate and as it passes out of the third transparent plate after reflection from said reflective surface.

4. The liquid crystal display of claim 1 wherein said reflective surface is a metalized surface.

5. A liquid crystal display comprising a layer of liquid crystal material disposed between first and second transparent parallel plates to provide a sandwich structure through which light can pass, said plates being coated on only selected areas thereof with films of transparent conductive material, means for polarizing light passing through said transparent plates and said liquid crystal layer, means for establishing a potential difference between films on the respective plates such that some areas of the sandwich structure will transmit light while others will not to thereby form an optical image, and reflector means adjacent one of said transparent plates adapted to reflect polarized light which has passed through the liquid crystal material back through the liquid crystal material, said reflector means including a metalized reflector and incorporating means for scattering polarized light without depolarizing the same.

6. The liquid crystal display of claim 5 wherein said reflector assembly comprises a sheet of metallic, reflecting material having a roughened surface facing said layer of liquid crystal material.

7. The liquid crystal display of claim 5 wherein said reflector assembly comprises discrete particles of metallic, reflecting material bonded together.

8. The liquid crystal display of claim 7 wherein said granules are disposed within a plastic matrix.

9. The liquid crystal display of claim 5 wherein said reflector assembly comprises a layer of metallic, reflecting material vacuum-deposited on a substrate having a roughened surface facing said liquid crystal layer.

* * * * *